United States Patent [19]
Yoshimura et al.

[11] Patent Number: 6,025,556
[45] Date of Patent: Feb. 15, 2000

[54] ELECTRONIC COMPONENTS WITH RESIN-COATED LEAD TERMINALS

[75] Inventors: Tatsuya Yoshimura; Yoshiyuki Yamashita; Minoru Shimada, all of Shiga, Japan

[73] Assignee: Murata Manufacturing Co., Ltd., Kyoto, Japan

[21] Appl. No.: 08/853,663

[22] Filed: May 9, 1997

[30] Foreign Application Priority Data

May 20, 1996 [JP] Japan ................................ 8-124730

[51] Int. Cl.$^7$ .................................... H01L 23/28
[52] U.S. Cl. .................. 174/52.2; 338/255; 338/256; 338/276; 338/22 R
[58] Field of Search .................... 338/255, 256, 338/257, 276, 225 D, 22 R; 174/52.2; 29/841, 855; 264/272.11; 257/790, 791

[56] References Cited

U.S. PATENT DOCUMENTS 3,824,328 7/1974 Ting et al. ......................... 174/52.2
4,104,509 8/1978 Van Bokestal et al. ............... 219/544
4,804,805 2/1989 Antonas et al. ...................... 174/52.2
4,873,507 10/1989 Antonas .............................. 338/22 R

FOREIGN PATENT DOCUMENTS 307946  9/1988  European Pat. Off. .
7-141924 11/1993  Japan .

Primary Examiner—Kristine Kincaid
Assistant Examiner—Hung V Ngo
Attorney, Agent, or Firm—Majestic, Parsons, Siebert & Hsue P.C.

[57] ABSTRACT

An electronic component includes a main element such as a thermistor having electrodes formed on its surfaces, and lead terminals are electrically connected to these electrodes. A resin coating covers the main element, and both the main element and the lead terminals, except their tip parts away from the main element, are covered with another resin coating of an electrically insulating and flexible resin material.

4 Claims, 3 Drawing Sheets

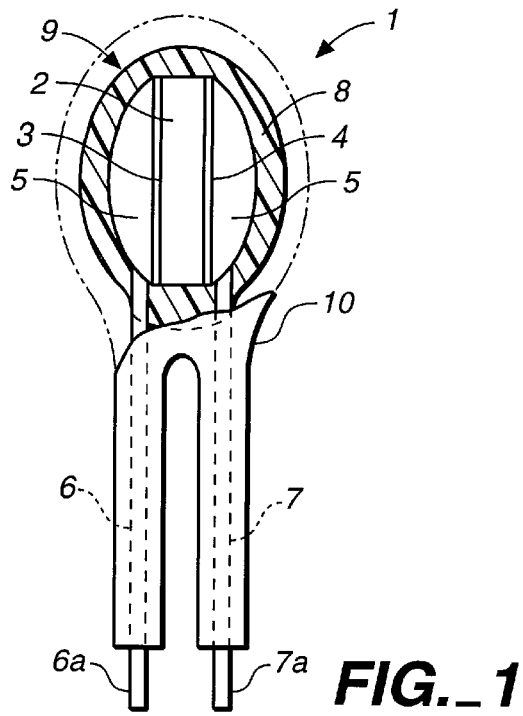
FIG._1
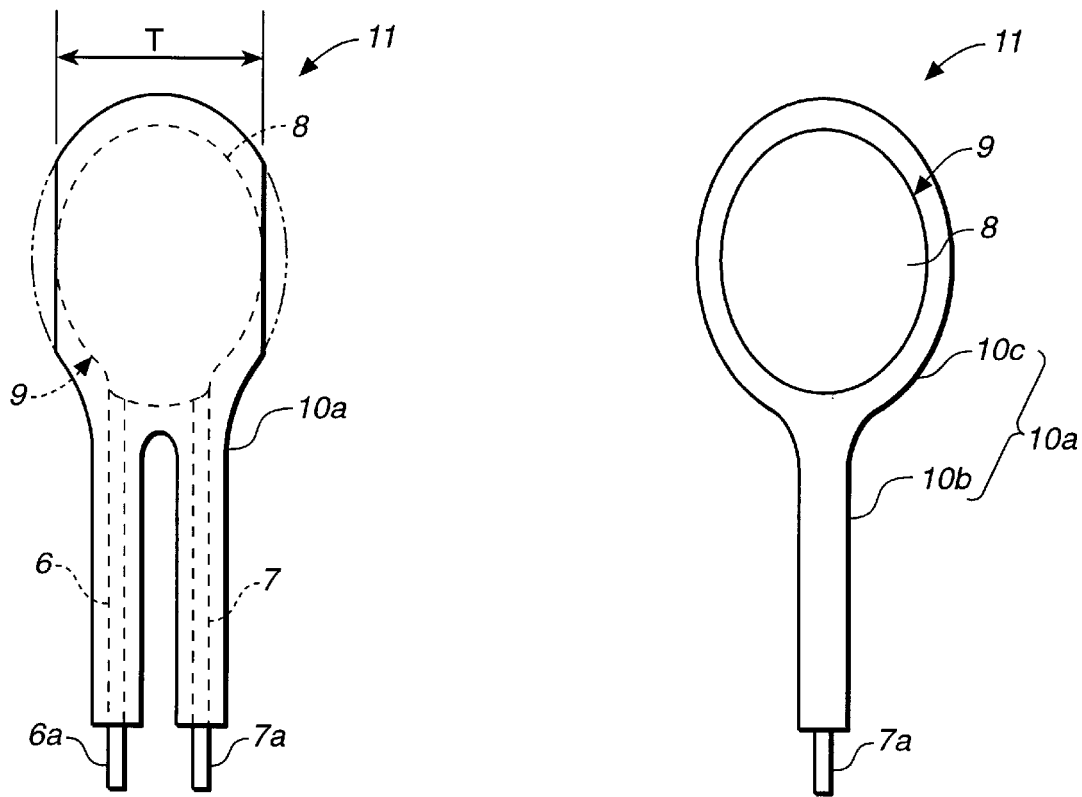
FIG._2A  FIG._2B

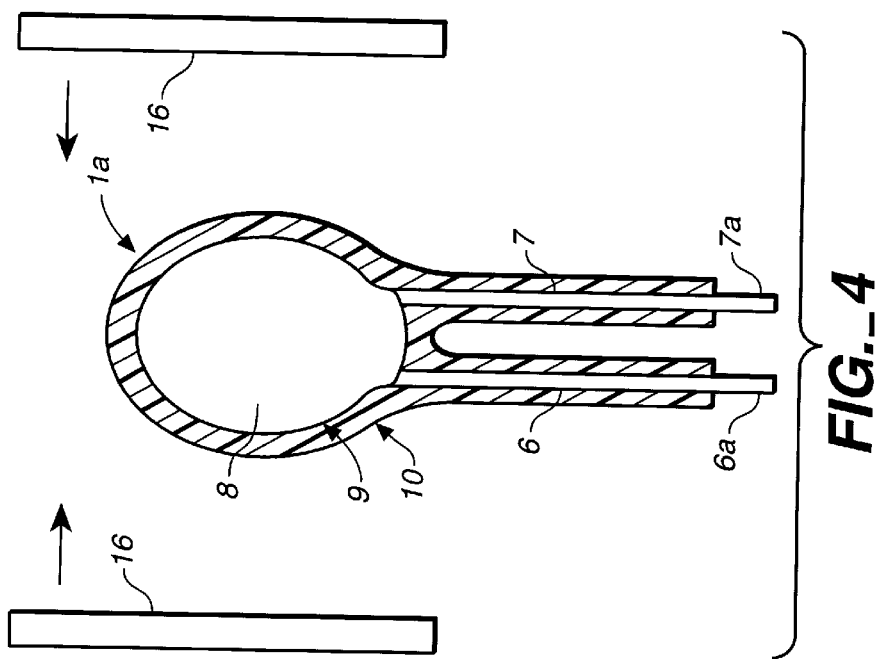
FIG._4
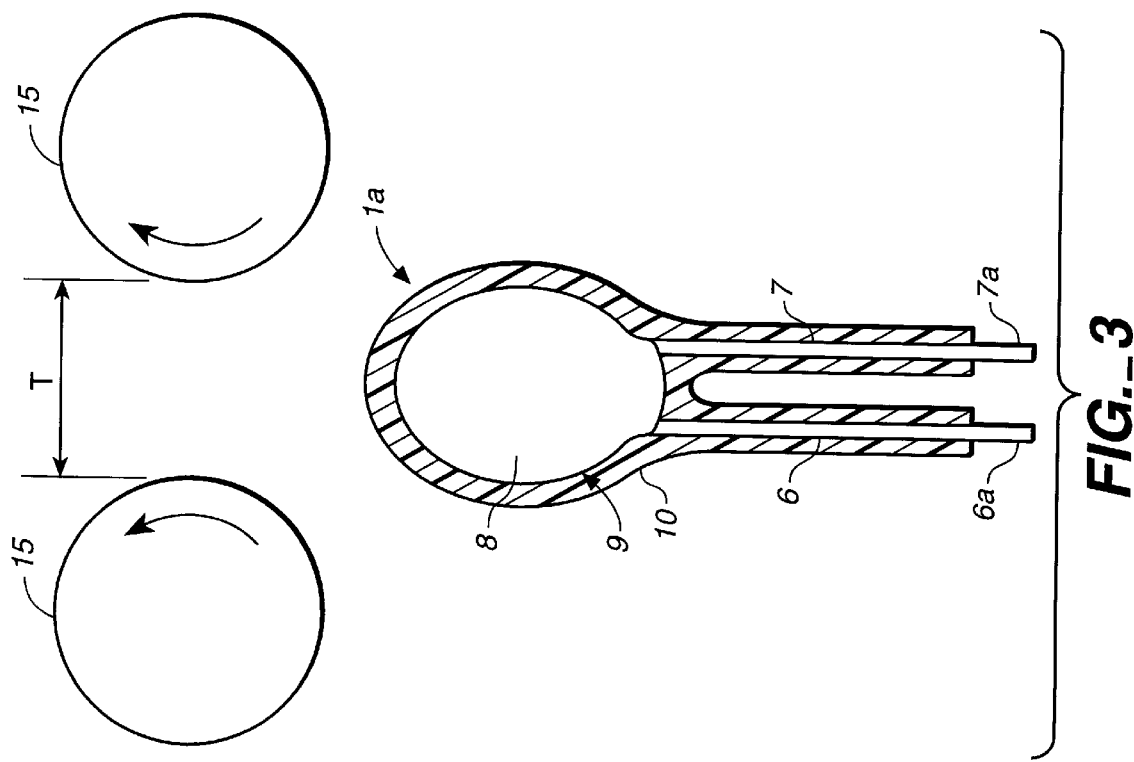
FIG._3

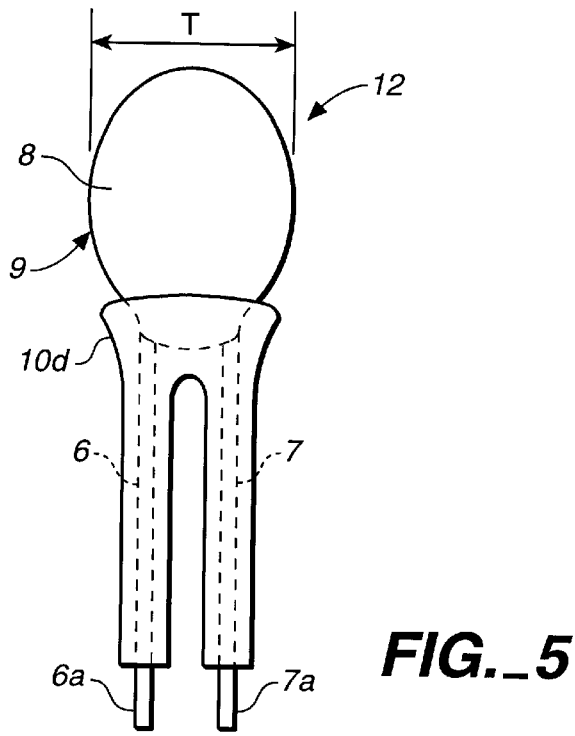
FIG._5
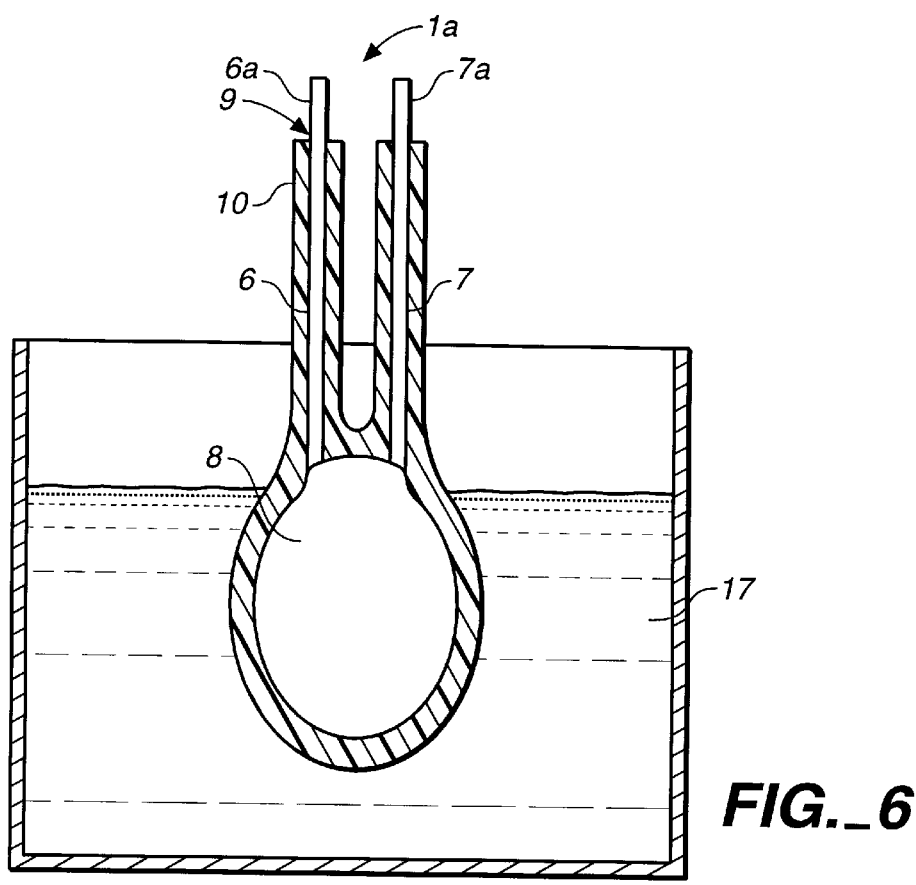
FIG._6

ELECTRONIC COMPONENTS WITH RESIN-COATED LEAD TERMINALS

BACKGROUND OF THE INVENTION

This invention relates to electronic components having lead terminals and more particularly to such electronic components having their lead terminals coated with an insulating resin material.

There are many kinds of prior art electronic components coated with a material such as resin for insulation and protection from the environment. In particular, electronic components having lead terminals coated for electrical insulation have been known. Some of such components had both the main body (or the main electronic element) and the lead terminals covered with a resin material principally comprising a silicone rubber resin, while some were produced by inserting an insulating tube around each lead terminal. Components of the kind having both the main electronic element and the lead terminals covered from outside are superior from the points of view of resistance against environment and mechanical strength but their coating film is easily peeled off if an external bending or scratching force is applied to a lead terminal. Those of the kind with tubes inserted around the lead terminals, on the other hand, are cumbersome to produce because of the extra manufacturing step required for inserting these tubes. In addition, gaps are easily formed between the externally coated main electronic element and the insulating tubes, exposing the lead terminals at these gaps. This means that the insulation is not reliably established.

SUMMARY OF THE INVENTION

It is therefore an object of this invention to provide an electronic component with an externally coated main electronic element having lead terminals which are electrically insulated and flexible.

It is a further object of this invention to produce such an electronic component which can be used in electronic devices required to be thin and small.

An electronic component embodying this invention, with which the above and other objects can be accomplished, may be characterized not only as comprising a main electronic element having electrodes formed on its surfaces, lead terminals electrically connected to these electrodes and a first resin coating which covers the main electronic element but also wherein both the main electronic element and the lead terminals, except their tip parts, are covered with a second resin coating. It is preferable that the second resin coating comprise a flexible insulating resin material and that the first resin coating on at least a pair of mutually opposite surfaces of the main electronic element not be covered by the second resin coating. The invention is particularly advantageous if the main electronic element is a thermistor with negative temperature characteristic.

With an electronic component thus characterized, its lead terminals, although they may be relatively long, can be bent easily if an external force is applied to them, and these electronic components can be easily incorporated in an electronic device which are miniaturized or made thin.

BRIEF DESCRIPTION OF THE DRAWINGS

The accompanying drawings, which are incorporated in and form a part of this specification, illustrate embodiments of the invention and, together with the description, serve to explain the principles of the invention.

In the drawings:

FIG. 1 is a partially sectional front view of an electronic component embodying this invention;

FIG. 2 shows another electronic component embodying this invention, FIG. 2A being its front view and FIG. 2B being its side view;

FIG. 3 is a schematic sectional view of the component of FIG. 2 for showing a method of its production;

FIG. 4 is a schematic sectional view of the component of FIG. 2 for showing another method of its production;

FIG. 5 is a front view of still another electronic component embodying this invention; and FIG. 6 is a partially sectional view of the component of FIG. 5 for showing its method of production.

Throughout herein, like parts are indicated by the same numerals and are not always repetitiously explained in detail.

DETAILED DESCRIPTION OF THE INVENTION

The invention is described next by way of an example. FIG. 1 shows an electronic component 1, comprising not only a prior art electronic component 9 having a planar thermistor 2 with negative temperature characteristic and a pair of terminal electrodes 3 and 4 on its mutually opposite surfaces, lead terminals 6 and 7 with one end connected electrically to the electrodes 3 and 4, respectively, and a first resin coating 8 covering the thermistor 2, but also a second resin coating 10 covering this prior art component 9 entirely except the tip parts 6a and 7a at the other ends of the lead terminals 6 and 7.

The first resin coating 8 comprises insulating epoxy resin of a kind which is conventionally used. It is hardened after the thermistor 2, inclusive of the terminal electrodes 3 and 4, is covered therewith. The second resin coating 10 is electrically insulating and flexible, comprising saturated copolymerized polyester resins soluble in organic solvents, and covers the prior art electronic component 9 entirely except the tip parts 6a and 7a of the lead terminals 6 and 7.

FIGS. 2–4 show another electronic component 11 according to another embodiment of this invention, using the same numerals as in FIG. 1 to indicate like parts which may not be repetitiously explained in detail.

The component 11 shown in FIG. 2 is different from the component 1 described above with reference to FIG. 1 in that a mutually opposite pair of surfaces of the first resin coating 8, in addition to the tip parts 6a and 7a of the lead terminals 6 and 7, is also left uncovered by a second resin coating 10a. This component 11 may be produced, for example, as follows. First, the prior art component 9 is immersed completely in a solution of the second resin coating 10 from the side of the thermistor 2 such that only the tip parts 6a and 7a of the lead terminals 6 and 7 are left above the solution. Next, the second resin coating 10, which is all over the prior art component 9 except at the tips 6a and 7a of the lead terminals 6 and 7, is provisionally hardened to obtain an intermediate product 1a as shown in FIG. 3. Next, the surface of the first resin coating 8 of this intermediate product 1a is passed between two rollers 15 separated from each other by a distance T and rotating in mutually opposite directions such that the second resin coating 10 on a mutually opposite pair of surfaces is either removed or crushed and deformed and that the first resin coating 8 becomes exposed to the exterior. The electronic component 11 embodying this invention is thereafter obtained by hardening the second resin coating 10 remaining on the surface of the prior art component 9, or mainly on its lead terminals 6 and 7.

In the production process described above, the second resin coating 10 can be hardened by heating for 30–180 minutes (such as 90 minutes) at 120° C.–180° C. (such as 150° C.). Through a production process as described above, the second resin coating can be formed with thickness of about 0.03 mm–0.80 mm (such as 0.05 mm–0.20 mm).

The electronic component 11 thus produced may be described as being obtained from the component 1 by removing the portion of its second resin coating 10 indicated by chain lines in FIG. 2A from a mutually opposite pair of surfaces. The second resin coating 10a is thus left at two separate places, one part 10b covering the lead terminal part and the other part 10c covering a top part of the first resin coating 8. It may also be said that the surface thickness T of this component 11 is less, according to the thickness of its second resin coating 10a.

The electronic component 11 shown in FIG. 2 according to the second embodiment of this invention may be produced also by using a pair of plates 16, as shown in FIG. 4, sandwiching therebetween the intermediate product 1a explained above so as to compressingly deform its second resin coating 10 covering the first resin coating 8 and to expose portions of the first resin coating 8, and thereafter hardening the second resin coating 10. By this method, too, the second resin coating 10 is removed from a mutually opposite surface areas to obtain a component as shown in FIG. 2A.

FIG. 5 shows still another electronic component 12 embodying this invention, characterized wherein the second resin coating 10d covers only the portions of the lead terminals 6 and 7 from where they connect to the thermistor 2 to their tip parts 6a and 7a but almost all parts of the first resin coating 8 and the tip parts 6a and 7a of the lead terminals 6 and 7 are not covered by the second resin coating 10d.

The component 12, as described above, may be produced by first obtaining the intermediate product 1a, as explained above with reference to FIG. 3, and then immersing its thermistor part, as shown in FIG. 6, in a solution 17 capable of dissolving the second resin coating 10. The second resin coating 10 is hardened thereafter to obtain the component 12 exposing the first resin component covering the thermistor 2 and the tip parts 6a and 7a of its lead terminals 6 and 7.

Although not separately illustrated, the component 12 according to a third embodiment of this invention may be produced also by keeping a solution of the second resin coating in a vessel capable of having the lead terminals 6 and 7 of the prior art component 9 immersed therein except the tip parts 6a and 7a of the lead terminals 6 and 7 and then immersing the prior art component 9 therein. The second resin coating 10 is then hardened. The component 12, thus produced, can be characterized also wherein its surface thickness T is reduced according to the thickness of its second resin coating 10d.

The invention has been described above with reference to only a limited number of examples, but these examples are not intended to limit the scope of the invention. Many modifications and variations are possible within the scope of the invention. Although the invention has been described above with examples containing a thermistor with negative temperature characteristic, it goes without saying that the invention is equally applicable to electronic components containing a thermistor with positive temperature characteristic or a capacitor.

The present invention is particularly useful, however, when applied to an electronic component containing a thermistor and used for the detection of temperature of a secondary battery pack because the main electronic element of such an electronic component must be placed as closely as possible to the target object of temperature detection in order to detect its temperature correctly. In such applications, it often becomes necessary to bend or split open the lead terminals of the electronic component because of the construction or wiring arrangement of the target object. Because the second resin coating is flexible according to this invention, the lead terminals of the components embodying this invention can be freely bent. Thus, the electronic components according to this invention find many useful applications. The components 11 and 12 shown in FIGS. 2 and 5 are particularly advantageous for use in miniaturized electronic devices for their smaller sizes.

It is claimed:

1. An electronic component comprising:
   a main electronic element having electrodes on opposite surfaces thereof;
   lead terminals electrically connected respectively to said electrodes;
   a first resin coating covering said main electronic element; and
   a second resin coating portions of covering said main electronic element and portions of said lead terminals except tip parts thereof distal said main electronic element, portions of said first resin coating on at least said opposite surfaces of said main electronic element not being covered by said second resin coating.

2. The electronic component of claim 1 wherein said second resin coating comprises an insulating flexible resin material.

3. The electronic component of claim 1 wherein said main electronic element is a thermistor with negative temperature characteristic.

4. The electronic component of claim 2 wherein said main electronic element is a thermistor with negative temperature characteristic.

* * * * *